United States Patent Office 3,676,102
Patented July 11, 1972

3,676,102
METHOD OF TREATING PLANTS
Arthur R. Clark and Margaret M. Clark, both of
P.O. Box 283, Spring Lake, N.J. 07762
No Drawing. Application Oct. 30, 1968, Ser. No. 771,975, now Patent No. 3,592,910, which is a continuation-in-part of application Ser. No. 676,019, Oct. 18, 1967. Divided and this application Oct. 19, 1970, Ser. No. 82,122
Int. Cl. A01n *5/00, 3/02*
U.S. Cl. 71—127
5 Claims

ABSTRACT OF THE DISCLOSURE

Liquid polyterpenes having a molecular weight of from 272 to 544 are applied to growing plants, particularly nursery stock and food crops, to provide the plants with a protective coating. The polyterpene coating inhibits the transpiration of water from the plants, and enhances plant growth.

---

This application is a division of application Ser. No. 771,975, now Pat. No. 3,592,910, issued July 13, 1971; which in turn is a continuation-in-part of application Ser. No. 676,019 filed Oct. 18, 1967, now abandoned.

THE TRANSPIRATION PROBLEM

Transpiration is the evaporation of water from plant tissue. The major water loss is through the leaves and usually occurs in two simultaneously operating stages; first, evaporation of water from the moist cell walls into the intercellular spaces of the leaf, and second, diffusion of the water vapor from the intercellular spaces, through the stomata, to the outside air. Loss of moisture through the stomata accounts for 95% of the total moisture loss due to transpiration.

If the evaporation of moisture from the leaves and branches by normal transpiration exceeds the amount absorbed through the roots, the plant eventually withers and dies. For example, plants and shubbery are severely injured and frequently killed by what is known as winter-kill, in which the foliage is subjected to extreme changes in temperature, while the frozen ground renders it impossible for the plant roots to draw sufficient moisture therefrom to compensate for that abstracted by air of low relative humidity. Plants in geographic areas having an arid climate, and those subjected to extended periods of draught are subject to severe injury due to transpiration.

Transpiration is also a major factor in the transplanting of trees, shrubbery and other plants. Many such plants are grown commercially in nurseries and are transplanted more than once before being removed to their final locations. In the course of transplanting operations the roots of such plants are unavoidably damaged so that the plant when replanted is unable to absorb moisture from the soil at its normal rate. In order to overcome excessive evaporation, leafy branches may be drastically pruned away. However, mortality of transplanted stock remains high.

Damage to plant roots, as for example in transplanting, as well as the deliberate pruning of the branches, expose the plants in a very critical period of their existence to infection by numerous plant pests, including fungus diseases, insect attacks, etc. Where plants are stored close together the spread of infections can be rapid.

Nursery stock, plant cuttings, roots and the like have been given protective and preservative coatings of various oils and waxes. Oils, in addition to being toxic to many varieties of plants, do not form adequately permanent films on the plant surfaces. Waxes are applied in a molten condition and such method of application involves a number of serious disadvantages. It is difficult to control the temperature of the hot wax, and it is therefore very easy to seriously injure plant life because of too high a temperature. When the wax is held at a temperature just slightly above the melting point, a thick film of wax is deposited because it solidifies very quickly with no drainage of excess material. A thick coating tends to flake off and transpiration becomes more rapid.

More recently gum-like compositions have been applied to plants as protective coatings, but such gum-like materials have their drawbacks. For example, natural gums lack uniformity. They are expensive and susceptible to attack by bacteria, fungi, etc. Because of this lack of uniformity, it is relatively difficult to predictably formulate the most effective composition for individual requirements. Further, plant treating compositions based on carboxymethyl cellulose yield brittle films, and the films themselves have relatively poor adhesion to plants, especially during handling.

Synthetic materials, such as rubber and vinyl latex compositions, have been applied to plants to check transpiration. These materials, in addition to being expensive, in many instances have not reduced the rate of transpiration to tolerable levels.

GENERAL DESCRIPTION

A principal object of this invention is to provide synthetic compositions comprising liquid polyterpenes for application to growing plants to inhibit transpiration and promote healthy plant growth. Such liquid polyterpenes, whose chemical and physical properties are described more fully hereinafter, are economical to manufacture, and are compatible with other materials commonly used for treating plants. The term "plant" is used in this specification and appended claims to be inclusive of trees, shrubs, food crops, foliage, bushes, flowers, grass, etc.

It was discovered that the above-enumerated problems, as well as others, can be overcome, and highly satisfactory results obtained by using as a coating medium for plants certain liquid polyterpenes, with or without additional ingredients. These polyterpenes may be applied cold to plants in the form of water emulsions, solutions in organic solvents or in undiluted condition. Advantageously the emulsions and solutions can be applied by spraying. The undiluted liquid polyterpenes may be applied as for example dipping or painting. Regardless of the mode of application used, the liquid polyterpenes form a thin, substantially continuous coating or film on the plant foliage or roots.

As will be seen from the following discussion, the liquid polyterpenes employed in the method of this invention, drastically reduce the rate of transpiration of plants to which they are applied. Furthermore, the liquid polyterpenes have been found to increase the yield of plant foilage and food crops to which they are applied.

THE LIQUID POLYTERPENES

The liquid polyterpenes employed in this invention may be obtained by the method described in U.S. Letters Pat. No. 3,314,981 issued to Clark et al. on Apr. 18, 1967. According to this patent, liquid polyterpenes having an average molecular weight below 500 are prepared in high yield by polymerizing a polymerizable terpene or mixture of terpenes, e.g. terpentine, at 100–200° C. in the presence of an effective amount of a catalyst which is an anhydrous metallic halide of the general formula $MX_n$ in which M is a metal of the Fridel-Crafts type, X is a halide and $n$ is an integer from 2 to 4, which is non-gaseous at ambient temperatures or a complex of such a metallic halide.

As to materials, the terpene can be any pure terpene, synthetic mixtures thereof, or naturally occurring terpene mixtures. Examples are alpha-pinene, beta-pinene, dipentene, terpinene, terpinolene, and various terpentines such as sulfate, wood, and gum. Of these the turpentine was preferred. American, Mexican, French, Russian, Spanish, etc. gum terpentines have been tried with approximately similar results and yields.

Examples of Friedel-Crafts catalysts are $AlCl_3$, $CrCl_3$, $AlBr_3$, $TiCl_4$, $SnCl_4$, $BeCl_2$, $FeCl_3$, $ZnCl_2$, $BiCl_3$, $SbCl_3$, $ZrCl_4$ and the like. Of these $AlCl_3$ is preferred.

The reaction conditions as well as the amount of anhydrous metal halide to terpene are very important. The anhydrous metal and terpene must be reacted at temperatures sufficiently high to form coordination complexes, such as $Al(X)_3Cl_3$ where X represents pinenes of various types as well as other terpenes within the turpentine mixtures found in various parts of the world.

As to proportions, the halide is added in the amount of about 0.1% to about 20%, based on the weight of the terpene. The preferred range is 3% to 5%. The amount of catalyst can vary dependent upon the moisture present in the terpene and the reactor system.

The coordination complexes are formed by adding about one-half of the total halide to the terpene and thoroughly mixing. Since the reaction is an exothermic one, heat is generated. The temperature rises and is kept within the range of about 100°–200° C. Additional amounts of halide are added during this period, and the temperature of the reaction is kept within these limits. The addition compound is formed in such a fashion that the decomposition compounds and penetration compounds are released from the polymer phase at the desired point of the reaction.

These liquid polyterpenes consist entirely of carbon and hydrogen and have the general formula

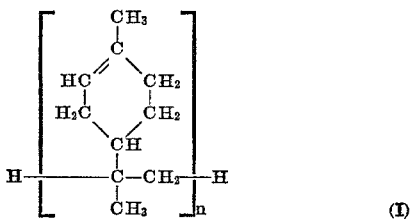

(I)

where $n$ is an integer from 2 to 4. Thus, the liquid polyterpenes have molecular weights ranging from 272 to 544. Ordinarily, the process of Pat. No. 3,314,981 will produce a mixture of different polyterpenes having an average molecular weight of from 300 to 400.

The liquid polyterpenes have an acid number of approximately zero, an average specific gravity of 0.95, an iodine number of approximately 98, an extremely low vapor pressure at room temperature, and a flash point of 330° F. They are relatively non-toxic to mammals and are non-toxic to plants when applied at the concentrations hereinafter set forth. However, since the polyterpenes have excellent film-forming properties, the films being resistant to air, light, and moisture penetration, high concentration may be phytotoxic to some plants.

As can be seen from Formula I, above, the liquid polyterpenes are short chain polymers. When deposited as a thin film and exposed to light and air, they slowly polymerize to form longer chain polymers of both linear and cross-linked structures. Unlike natural rubber latex or other film formers, the polymerization process is relatively slow, and weeks and even months are required before the soft initial polymers are transformed to a powder-like resin or rosin. During the polymerization process the initial semi-tacky film, which results after evaporation of water or organic solvent, is transformed into an intermediate non-tacky, flexible film.

The length of time for the development of each stage of polymerization depends upon the solvent used or the water composition applied, as well as the weathering conditions. Transformation of the polymers into a non-tacky flexible film occurs in both indoor and outdoor applications. However, conversion to the powder-like resin generally only occurs in outdoor applications. As will be seen from later discussions, the progressive polymerization of the liquid polyterpenes has many advantages, particularly when used in contamination with various plant nutrients.

The permanency or weathering action of the polyterpene films is dependent upon the molecular weight of the polymers and the amount of impurities present. By employing the process of the Clark et al. Pat. No. 3,314,981 for producing polyterpenes for use in this invention, products having different molecular weights and different degrees of purity can be obtained. The higher molecular weight polymers with a given purity are more rapidly polymerized to the powdery state than those of lower molecular weight. The lower molecular weight terpene polymers must first polymerize to yield the higher molecular weight polymers before weathering action can occur. Those polymers which are less pure, e.g. contaminated with catalyst or reaction by-products, weather more rapidly than the corresponding purer forms. Thus, by controlling molecular weight and purity, terpene polymer compositions which exhibit weather breakdown ranging from several days to several months can be obtained.

THE POLYTERPENE COMPOSITIONS

As stated above, the liquid polyterpenes employed in the compositions and methods of this invention may be applied to plants and the soil about the roots of plants in the form of aqueous emulsions, as solutions in organic solvents, or in undiluted form.

Water emulsions may be prepared with the aid of emulsifiers. Any general type emulsifier can be used such as triethanolamine stearate, sodium lauryl sulfonate, sodium alkyl naphthalene sulfonate, sodium oleate, p,t-octylphenoxypolyethoxyethanol, as well as other well-known emulsifiers. The viscosity of the higher molecular weight terpene polymers, e.g. those having an average molecular weight of from 400 to 544, can be lowered by means of a suitable organic solvent of the types hereinafter listed to aid in emulsification.

Aqueous emulsions according to this invention may comprise 50% or more, by volume, of the liquid polyterpenes. Generally, the amount of polyterpenes present will depend upon the specific use for which the emulsion is designed and the method of application. Advantageously, rate of application of polyterpenes to plants can be readily controlled with a minimum of waste by controlling the concentration of polyterpenes in the emulsion. For most purposes, where spray application is to be employed the polyterpenes will be present in the emulsions in an amount of from about 1 to about 20% by volume. In these emulsions, the emulsifier will ordinarily comprise from about 0.01 to 1 percent by weight of the total cmoposition.

The liquid polyterpenes are soluble in all aliphatic and aromatic hydrocarbon solvents, ketones (except acetone), high molecular weight alcohols, and chlorinated solvents. In making compositions suitable for use in this invention, preferably highly volatile solvents which are relatively non-phytotoxic to plants are employed. A preferred solvent is xylene because it quickly evaporates, thereby minimizing possible phytotoxic effects. Solvents of low volatility such as kerosene and superior oil should be used only on hardy plant foliage or bark. As with the aqueous emulsions, the solvent base compositions may contain 50% or more by volume of polyterpene, the selected concentration depending upon ultimate use and mode of application. More dilute solutions, e.g. those containing 20% or less of polyterpenes, are preferred where spray application is intended.

APPLICATION OF THE POLYTERPENE COMPOSITIONS

It was discovered that the application of the above-described liquid polyterpenes to plants produces a number of beneficial results. Of particular significance was the discovery that the liquid polyterpenes can be used to effectively control transpiration. The liquid polyterpenes when applied to plants as a spray in either the form of an aqueous emulsion or as a solution in an organic solvent form a substantially continuous coating on the plants. This coating forms a substantially water impervious barrier on the surface of leaves and other plant parts. The stomato actions are interfered with and the water transpiration is substantially stopped. The movement of oxygen and other transpiration gases is, however, apparently not impaired, as no phytotoxic symptoms are generally observed.

The following examples are merely illustrative of the application of this invention to the problem of water transpiration by plants and should not be construed as limiting the scope of the invention.

Example I

Plants were grown in waterproof containers, the tops of which containers were covered and sealed with two layers of polyethylene. The above ground portion of the plants extended through the layers of polyethylene. Water loss from the same containers which did not contain plants was negligible during the four week test period. The weight of each container was taken at the start of each test and again at specified intervals.

Like amounts of three different compositions were applied to different plants of the same species. Composition A comprised an aqueous emulsion containing 5% by volume of a mixture of polyterpenes having an average molecular weight of about 350. Compositions B and C comprised rubber latexes each containing 20% by weight of rubber solids. The data in Table I below show the percent water loss compared to the untreated control plants at the time specified.

TABLE I

| Plant species | Percent water loss (weeks from initial treatment) | | | | | | | | | | | | | | |
|---|---|---|---|---|---|---|---|---|---|---|---|---|---|---|---|
| | Composition A | | | | | Composition B | | | | | Composition C | | | | |
| | 1 | 2 | 3 | 4 | 5 | 1 | 2 | 3 | 4 | 5 | 1 | 2 | 3 | 4 | 5 |
| Calif. privet (*Ligustrum ovalifolum*) | 24 | 26 | 29 | 43 | 40 | 54 | 63 | 68 | 76 | 88 | 38 | 38 | 43 | 50 | 58 |
| Arbor vitae (*Thuja occidentalis nigra*) | 5 | 4 | 4 | 5 | 8 | 70 | 79 | 82 | 92 | 94 | 50 | 63 | 65 | 73 | 78 |
| Horiz. juniper (*Juniperus horizontalis*) | 5 | 5 | 6 | 6 | 9 | 68 | 75 | 81 | 85 | 84 | 56 | 59 | 66 | 65 | 66 |
| Canadian hemlock (*Tsuga canadeniss*) | 9 | 9 | 9 | 9 | 9 | 54 | 67 | 57 | 58 | 57 | 30 | 24 | 23 | 22 | 22 |
| American holly (*Ilex opaca* "Hedge Holly") | 68 | 73 | 74 | 74 | 75 | 80 | 80 | 75 | 75 | 76 | 77 | 80 | 76 | 76 | 78 |
| Boxwood (*Buxus sempervirens* "Newport Blue") | 34 | 37 | 44 | 55 | 60 | 58 | 75 | 91 | 100 | 100 | 73 | 83 | 89 | 100 | 100 |

Example II

Four upright yews were drench sprayed with an aqueous emulsion containing 10% by volume of liquid polyterpenes having an average molecular weight of about 350–375. The yews were located approximately one and a half city blocks from the Atlantic Ocean along the northern coast of New Jersey. One week subsequent to spraying a typical "Northeaster" struck the area. The winds were severe, but there was very little rain. The yews evidenced substantially no damage, the protection provided by the coating of polyterpenes being at least 95% effective. Other yews and various evergreens in the area were observed to have suffered considerable damage due to water transpiration and by the salts and other chemicals deposited during the storm as evidenced by burn off of the new tender growth.

The amount of liquid terpene polymer applied to plants to inhibit transpiration of moisture will vary to some degree with the particular species of plant. Table II, below, lists various plant types and amounts of liquid terpenes, in terms of gallons per acre when applied as a spray, which have been found effective to inhibit transpiration. Although the application rates given are for pure polyterpenes, ordinarily the polyterpenes will be applied in the form of aqueous emulsions or solutions in volatile organic solvents of the type described hereinabove.

TABLE II (A) Needled Evergreens—5 to 60 gallons/acre
    Pines: White, Red, Sugar, Pondersoa, Longleaf, Scotch, Virginia
    Firs: Douglas, Balsam Norway, Common China
    Spruce: Red, Black, White, Norway
    Hemlock: Eastern, Canadian
    Cedar: Eastern, Red
    Yewes: Common, Plum
    Horizontal Juniper
    Arbor-Vitae
    Cypress (B) Broadleaf Evergreens—2 to 30 gallons/acre
    Azalea, Rhododendron, Pyracantha, Laurel, Boxwood, Ivy, Holly, California Privet (C) Vegetables—2 to 10 gallons/acre
    Tomatoes, cabbage, peppers, potatoes, peas, beans, corn, Cucurbits, Cole crops (D) Fruits—2 to 10 gallons/acre
    Apples, peaches, cherries, oranges, grapefruit, grapes, berries, plums, pears (E) Flowering plants—2 to 10 gallons/acre
    Roses, Zinnia, Snapdragons, Poinsettia, Peony, Gladiolus, Geranium, Ferns, Camellia Cut flowers have always been a problem, and by coating these with a thin film of the liquid polyterpenes, either by spraying or dipping, transpiration therefrom can be greatly reduced so that they will maintain their freshness. Preferably, cut flowers are treated with aqueous emulsions containing from about 2 to about 10 percent by volume of liquid polyterpene.

Similarly Christmas trees which have been separated from their roots can be coated with liquid polyterpenes. The coating not only retains the moisture in the tree, but also aids in retaining the needles in place, giving the tree a fresh, natural appearance. Fireproofing agents, such as boric acid, may be included in the coating compositions, which ordinarily will be aqueous emulsions, to make the trees non-flammable, so that they can be used safely in such places as department stores, office buildings, homes, etc.

In addition, application of the liquid polyterpenes to growing Scotch Pine and Blue Spruce in the fall has been found to reduce the tendency of these evergreens to brown out in the fall.

As stated above, winter-drying or winter-kill is caused by the rapid loss of water from a plant at a time when the water in the soil is frozen and is not available to the plant. Strong winds, when the air temperature is either high or low, cause the leaves on the exposed side of the tree to lose water to such an extent that the tissues wilt and die. It was discovered that by coaing evergreens with liquid polyterpenes according to this invention such winter-kill can be avoided and that the evergreens retain their green color throughout the winter. The rates of application for evergreens given in Table II, above, will provide adequate protection against winter-kill.

Another advantage of this invention is that the coating of liquid terpene polymer protects vegetation from airborne industrial waste, commonly referred to as "smog."

As can be seen from the following example, the roots of plants may be protected by being coated with the liquid terpene polymers, whereby the morality rate on transplanting is greatly reduced.

Example III

Several types of needled evergreens were removed from the earth and the roots placed in packages in which they remained for about 3 to 4 weeks before being planted. Various materials were used to protect the roots while packaged. In Table III, below, are data showing the percent of the stock which survived two weeks after planting.

TABLE III

| | Percent of stock surviving | | | |
|---|---|---|---|---|
| Root preservative | White pine | White spruce | Scotch pine | Norway spruce |
| Excelsior | 95 | 87 | 94 | 94 |
| Clay | 97 | 90 | 90 | 80 |
| Polyterpene [1] | 95 | 91 | 100 | 91 |
| Unprotected (Control) | 74 | 36 | 76 | 60 |

[1] Liquid polyterpene having an average molecular weight of 300–400; applied to roots as aqueous emulsion by dipping.

High temperatures interfere with the vital plant biological processes. It is, therefore, desirable to protect plants from excessive sun radiation in order to minimize heat shocks. As can be seen from the following example the liquid polyterpene coatings reflect radiation from leaf surfaces to which they are applied thereby lowering the surface temperature of the leaves exposed to direct sunlight.

Example IV

Tests were conducted on rhododendron leaves out of doors under three conditions of air temperature and light intensity. The temperatures of treated leaves in full sun were compared with those of untreated leaves in full sun and in 60 percent shade. The treated leaves had applied thereto two compositions, A and B. Composition A was an aqueous emulsion of liquid polyterpenes having an average molecular weight of 300 to 400 and containing about 5%, by volume, of polyterpenes. Composition B is the same as A but contains, in addition, aluminum powder.

TEMPERATURES OF LEAVES

| | Light intensity (f.c.) | | |
|---|---|---|---|
| Treatments | 700 | 8,500 | >10,000 |
| 1. Control (no treatment) | a | a+7.0 | a+4.0 |
| 2. Composition A | a | a+4.0 | a+1 |
| 3. Composition B | a | a+4.0 | a | a = Signifies the observed temperature and all "a's" are essentially the same temperature.

These results show that the liquid polyterpene coatings are effective for reflecting sun radiation.

The aluminum powder in Composition B is in the form of exceedingly thin platelets. Because of their shape, they deposit on surfaces in an overlapping fashion completely sealing the underlying material on which they are deposited from sunlight radiation. Agricultural experimenters have used this powder as a means of reducing the absorption of sun radiation by foliage of plants thereby achieving lower leaf surface temperatures. Consequently, the plants were not required to transpire as much water in order to hold the surface temperature to a range within their capacity to survive. The foregoing data show that polyterpenes alone are essentially as effective as polyterpenes with the aluminum dust.

INCREASED YIELDS OF PLANT FOLIAGE AND FRUIT

It was discovered that by means of the present invention the yields of plant foliage and fruit were unexpectedly increased. Apparently, the liquid polyterpenes when applied to plants even at rates below those providing effective transpiration inhibition, e.g. rates as low as 0.5 gallon per acre, provide the plant foliage with protection against the damaging rays of sunlight. The lower foliage temperatures thereby provided allow for more efficient functioning of the enzymatic system of the plants.

Example V

Plots with growing tomato plants were sprayed with an aqueous emulsion of liquid polyterpenes having an average molecular weight of 300 to 400 at the rate of 0.5 gallon per acre. The emulsion comprised 0.5 gallon of liquid polyterpenes per 100 gallons of water. Other plots with growing tomato plants were left untreated.

When the crop was harvested, the treated plots had a yield of 260.8 pounds of tomatoes as compared to 200.1 pounds for the untreated plots, representing an increase in yield of approximately 30 percent.

Example VI

Two hundred parts of American gum turpentine are heated to 125–130° C. and allowed to cool to 60° C. Two and one-half (2½) parts of anhydrous aluminum chloride ($AlCl_3$) are added immediately with stirring not allowing the temperature to rise above 125–130° C. range. Small increments of anhydrous aluminum chloride are added with cooling to remain below the 125–130° C. range until a total of three (3) parts of anhydrous aluminum chloride are added. The mixture is cooled to 79–80° C. with the addition of 150 parts of heptane and allowed to reflux shortly after the addition of two parts of anhydrous aluminum chloride. The temperature is raised gradually to 155° C. and allowed to cool to 80° C. At this point 150 parts of heptane are mixed with the polyterpene and the solution is decanted and filtered to remove all the solid phase derived from the aluminum chloride-pinene addition compound. The treated heptane polymer is mixed with 30 parts of $CaCO_3 \cdot MgCO_3$ plus 300 parts of water and mixed thoroughly until all the soluble catalyst is removed and a very light color results in the heptane phase. The solids are removed via filtration and the water separated from the heptane phase. The heptane is stripped off leaving a liquid polymer.

Example VII

The procedure as given in Example VI is repeated, but 50 parts of ammonia water are used in place of thirty parts of $CaCO_3 \cdot MgCO_3$ for the neutralization. After thorough mixing, the water is separated from the heptane phase. The heptane is stripped off leaving a reddish-brown liquid polymer (av. M.W. 300–400).

What is claimed is:

1. The method of inhibiting transpiration of moisture from growing plants which comprises applying thereto a composition consisting essentially of a normally liquid terpene polymer having a molecular weight of from 272 to 544, and obtained by reacting a terpene selected from the group consisting of a alpha-pinene, beta pinene, dipentene, and mixtures thereof, and an effective amount of an anhydrous metallic halide that is non-gaseous at ambient temperature having the formula $MX_n$ in which M is a metal of the Friedel-Crafts type, X is a halide and $n$ is an integer from 2 to 4, and satisfies the valence of the metal M, to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

2. The method according to claim 1 in which said terpene polymer is applied at a rate of from about 1 to about 60 gallons per acre.

3. The method according to claim 1 in which said terpene polymer is applied at a rate of from about 2 to about 30 gallons per acre.

4. The method according to claim 1 in which said composition comprise an aqueous emulsion containing up to about 50 percent by volume of said liquid terpene polymer.

5. The method according to claim 1 in which said composition comprises up to about 50 percent by volume of said liquid terpene polymer dissolved in a volatile organic solvent.

References Cited

UNITED STATES PATENTS

| | | | |
|---|---|---|---|
| 3,314,981 | 4/1967 | Clark et al. | 260—93.3 UX |
| 2,761,805 | 9/1956 | Huidobro | 424—196 X |
| 3,220,994 | 11/1965 | Clark et al. | 260—93.3 |
| 3,157,964 | 11/1964 | Ferguson et al. | 117—3 X |
| 2,368,782 | 2/1945 | Rummelsburg | 260—93.3 UX |
| 2,370,688 | 3/1945 | Rummelsburg | 260—93.3 X |
| 2,280,813 | 8/1957 | Maguire et al. | 260—93.3 |

WILLIAM D. MARTIN, Primary Examiner

H. J. GWINNELL, Assistant Examiner

U.S. Cl. X.R.

117—3

UNITED STATES PATENT OFFICE
CERTIFICATE OF CORRECTION

Patent No. 3,676,102        Dated July 11, 1972

Inventor(s) ARTHUR R. CLARK and MARGARET M. CLARK

It is certified that error appears in the above-identified patent and that said Letters Patent are hereby corrected as shown below:

Column 2, line 57; "foilage" should read --foliage--

Column 4, line 8; "contamination" should read

--combination--

Column 4, line 57; "cmoposition" should read --composition--

Column 6, line 70; "coaing" should read --coating--

Column 7, line 6; "moratility" should read --mortality--

Column 8, line 36; "79-80°" should read --70-80°--

Column 8, line 58; "(av. M.W. 300-400) should read

--(ave. M.W. 300-400)--

Column 8, line 65; "consisting of a alpha-pinene" should read --consisting of alpha-pinene--

Column 10, line 10; "2,280,813" should read --2,802,813--

Signed and sealed this 9th day of January 1973.

(SEAL)
Attest:

EDWARD M. FLETCHER, JR.        ROBERT GOTTSCHALK
Attesting Officer             Commissioner of Patents